United States Patent
Mori

[11] Patent Number: 5,308,951
[45] Date of Patent: May 3, 1994

[54] LASER BEAM MACHINE
[75] Inventor: Atsushi Mori, Minamitsuru, Japan
[73] Assignee: Fanuc Ltd., Yamanashi, Japan
[21] Appl. No.: 952,907
[22] PCT Filed: Apr. 17, 1992
[86] PCT No.: PCT/JP92/00499
§ 371 Date: Nov. 19, 1992
§ 102(e) Date: Nov. 19, 1992
[87] PCT Pub. No.: WO92/18285
PCT Pub. Date: Oct. 29, 1992

[30] Foreign Application Priority Data
Apr. 23, 1991 [JP] Japan .................. 3-119506
[51] Int. Cl.[5] .................................. B23K 26/16
[52] U.S. Cl. ...................... 219/121.84; 219/121.74
[58] Field of Search ........... 219/121.6, 121.85, 121.67, 219/121.72, 121.63, 121.64, 121.84, 121.74, 121.75

[56] References Cited
U.S. PATENT DOCUMENTS

| 4,303,824 | 12/1981 | Morgan et al. | 219/121.84 |
| 4,315,133 | 2/1982 | Morgan et al. | 219/121.84 |
| 4,347,785 | 9/1982 | Chase et al. | 219/121.84 X |
| 4,892,992 | 1/1990 | Akeel et al. | 219/121.84 X |

FOREIGN PATENT DOCUMENTS

| 2326296 | 12/1974 | Fed. Rep. of Germany | 219/121.84 |
| 0154287 | 6/1988 | Japan | 219/121.84 |
| 2-87588 | 7/1990 | Japan | |

Primary Examiner—C. L. Albritton
Attorney, Agent, or Firm—Staas & Halsey

[57] ABSTRACT

A laser beam machine capable of preventing contaminants from entering a machining head. A laser beam (2) is reflected by a mirror (4) in a light guide passage (12) and introduced into the machining head (5). The laser beam is then focused by a parabolic mirror (6) to be irradiated onto a spot (7a) on a surface of a workpiece (7). An auxiliary gas (10) is ejected from a gas supply section (9) and throttled by a nozzle (11) to be supplied to the workpiece (7). The surface of the workpiece (7) is melted due to interaction between the laser beam (2) and the auxiliary gas (10), whereby a laser beam machining is achieved. An impeller (20) is arranged between the parabolic mirror (6) of the machining head (5) and the workpiece (7). A motor (21) for driving the impeller (20) is secured to a side wall (51) of the machining head (5) and rotates the impeller (20) at a high speed.

6 Claims, 4 Drawing Sheets

LASER BEAM MACHINE

TECHNICAL FIELD

This invention relates to a laser beam machine for machining a workpiece with a laser beam irradiated thereto, and more particularly, to a laser beam machine capable of preventing spatters and the like from entering a machining head.

BACKGROUND ART

Recently, an increasing number of metal machining techniques using a laser beam machine have been proposed. FIG. 4 schematically shows the arrangement of a conventional laser beam machine which is in wide use. In this laser beam machine, a laser beam 2 emitted from a laser oscillator 1 is reflected by mirrors 3 and 4 in a light guide passage 12 and introduced into a machining head 5. The laser beam is then focused by a parabolic mirror 6 and irradiated onto a surface of a workpiece 7. An auxiliary gas 10 is supplied from a gas cylinder, not shown, to a gas supply section 9 through a gas pipe 8. The auxiliary gas 10 is ejected from the gas supply section 9 and throttled by a nozzle 11 to be supplied to the workpiece 7. The surface of the workpiece 7 is melted due to interaction between the laser beam 2 and the auxiliary gas 10, whereby a laser beam machining is carried out.

In the laser beam machine shown in FIG. 4, however, a large amount of contaminants 13 such as spatters and oil mist (contaminative gas) is scattered from the workpiece 7 and enters the machining head 5. Such contaminants 13 stain the parabolic mirror 6 and even the light guide passage 12 and the mirrors 3 and 4. A problem therefore arises in that these parts must be frequently cleaned, making the maintenance difficult. Further, in the case of a three-dimensional machining operation using a laser beam machine so designed, the machining head 5 is oriented in every direction, sideways or upward, and thus can be even more contaminated by spatters and the like. Consequently, the application of three-dimensional laser beam machining is severely restricted.

DISCLOSURE OF THE INVENTION

This invention was contrived in view of the above circumstances, and an object thereof is to provide a laser beam machine capable of preventing contaminants from entering a machining head.

Another object of this invention is to provide a laser beam machine permitting a wide application of three-dimensional machining.

To achieve the above objects, this invention provides a laser beam machine for machining a workpiece with a laser beam irradiated thereto, comprising an optical part constituting a light guide passage for the laser beam, and an impeller arranged between the optical part and the workpiece and rotated at a high speed.

The impeller is arranged between the optical part constituting the light guide passage for the laser beam and a workpiece to be machined with the laser beam, and is rotated at a high speed. Accordingly, even if contaminants such as spatters and oil mist produced during a laser beam machining are scattered toward the machining head, they are repulsed by the impeller, and contamination of, e.g., the optical part forming the light guide passage for the laser beam is prevented. The laser beam is also somewhat intercepted by the impeller, but since the speed of the laser beam is equivalent to that of light, such interception is negligible and the laser beam machining operation is not adversely affected.

BEST MODE OF CARRYING OUT THE INVENTION

Embodiments of this invention will be described with reference to the drawings.

Figure 1:
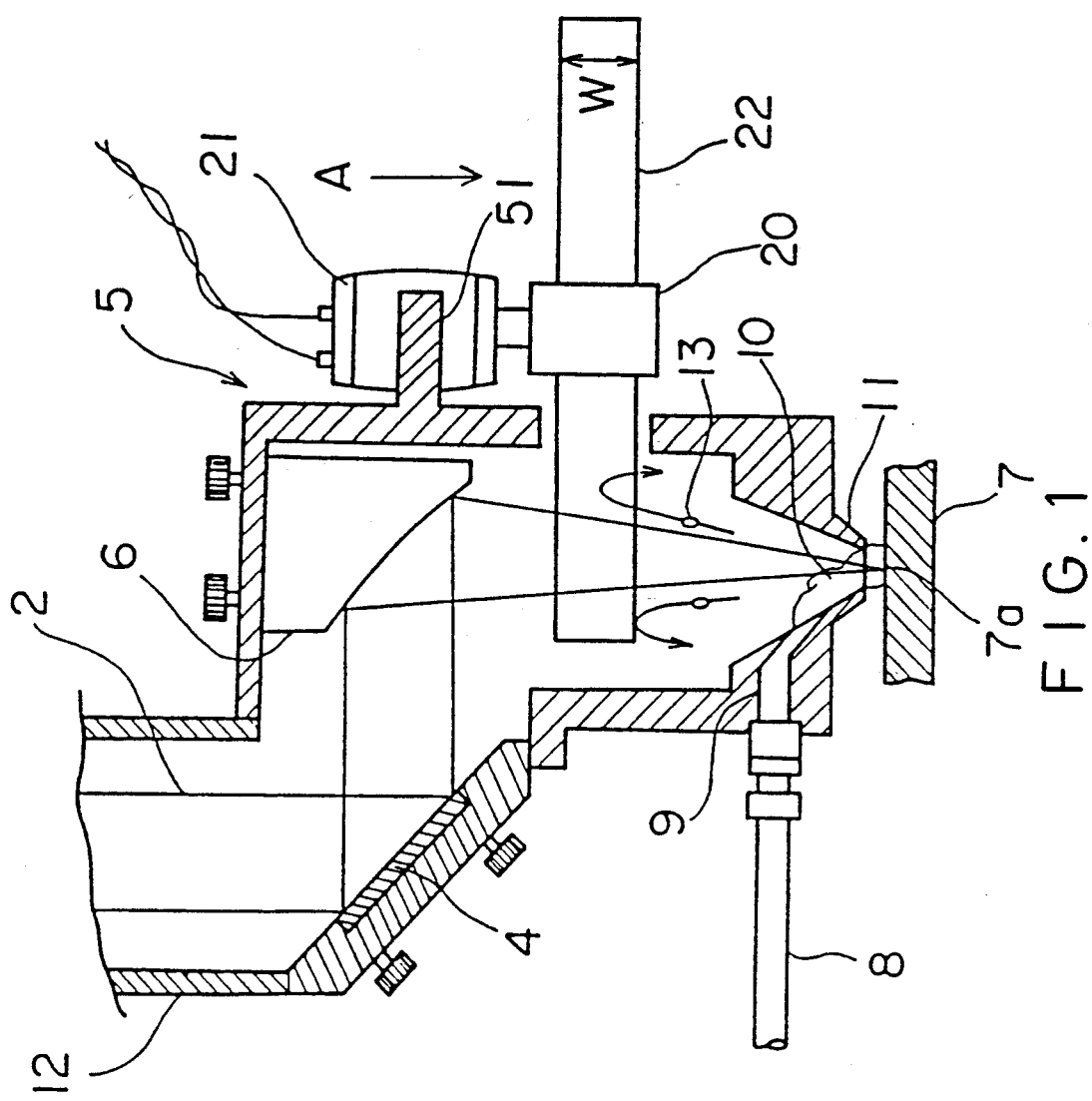
FIG. 1 is a schematic diagram showing the arrangement of a laser beam machine according to an embodiment of this invention.
Figure 4:
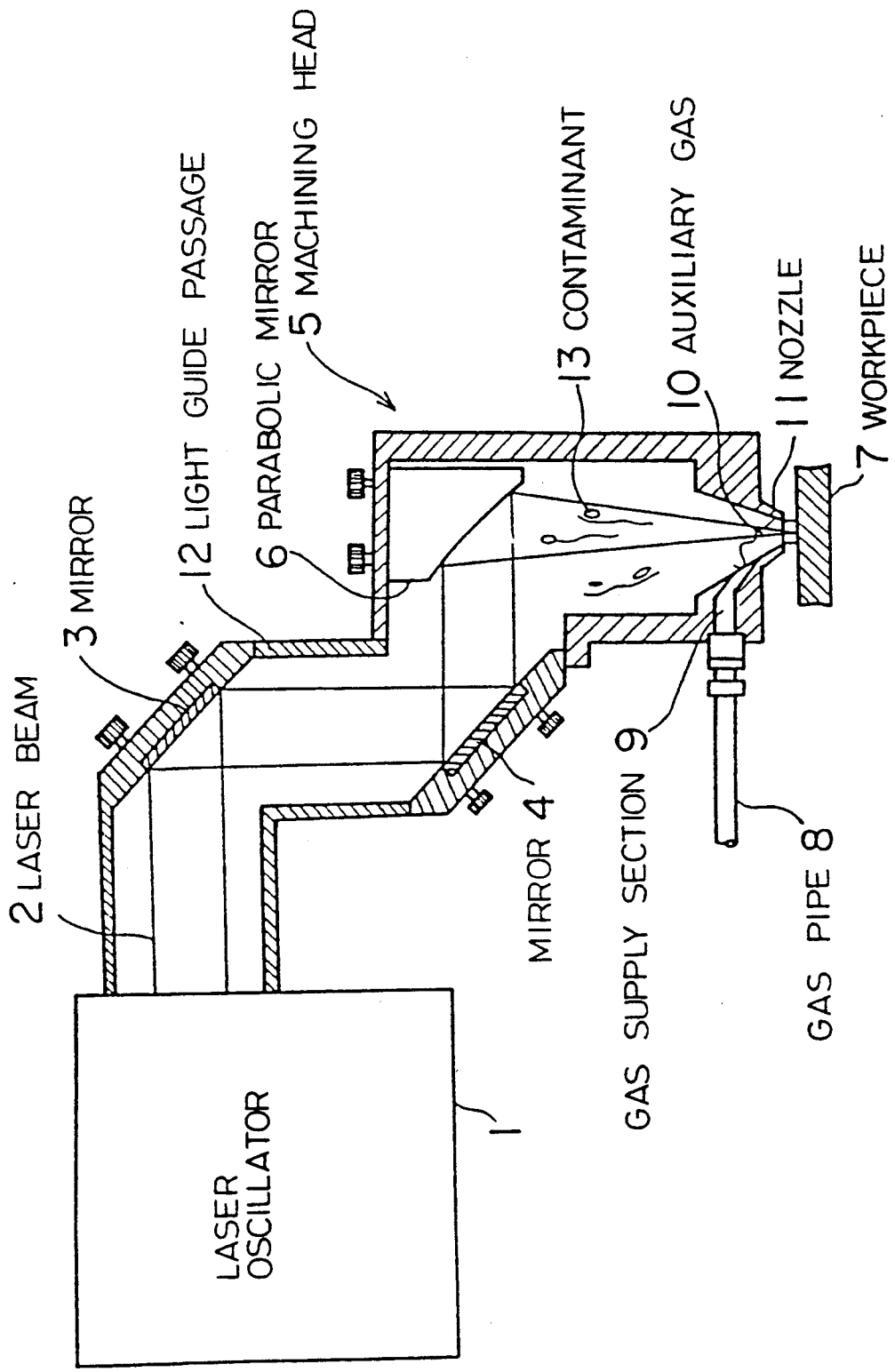
FIG. 4 is a schematic diagram showing the arrangement of a conventional laser beam machine.

FIG. 1 schematically shows the arrangement of a laser beam machine according to one embodiment of this invention. In FIG. 1, like reference numerals are used to represent like elements appearing in FIG. 4. A laser beam 2 is reflected by a mirror 4 in a light guide passage 12 and introduced into a machining head 5. The laser beam 2 is then focused by a parabolic mirror 6 to be irradiated onto a spot 7a on a surface of a workpiece 7. An auxiliary gas 10 is supplied from a gas cylinder, not shown, to a gas supply section 9 through a gas pipe 8. The auxiliary gas 10 is ejected from the gas supply section 9 and throttled by a nozzle 11 to be supplied to the workpiece 7. The surface of the workpiece 7 is melted due to interaction between the laser beam 2 and the auxiliary gas 10, whereby a laser beam machining is carried out.

An impeller 20 is arranged between the parabolic mirror 6 of the machining head 5 and the workpiece 7. A motor 21 for driving the impeller 20 is secured to a side wall 51 of the machining head 5, and rotates the impeller 20 at a high speed.

Figure 2:
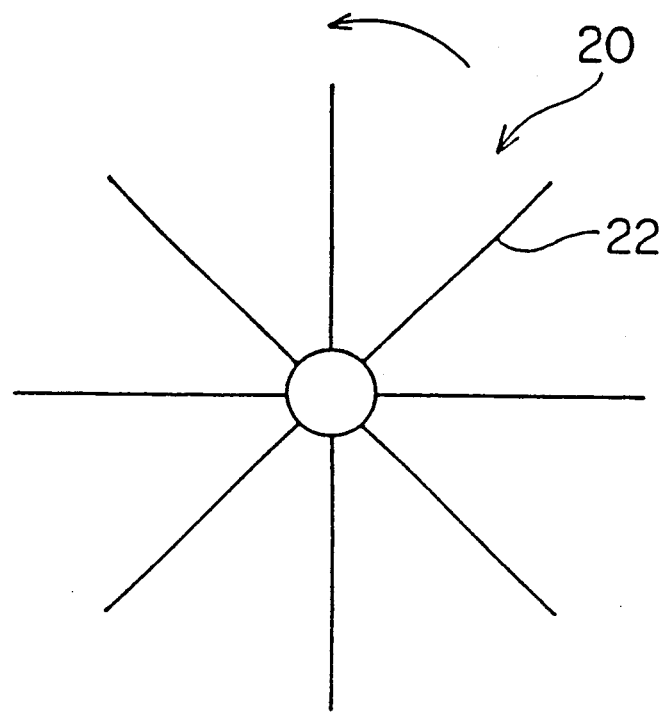
FIG. 2 is a view of an impeller as viewed from a direction indicated by arrow A in FIG. 1.

FIG. 2 shows the impeller as viewed from a direction indicated by arrow A in FIG. 1. The impeller 20 has eight blades 22 each comprising a thin rectangular member made of a heat-resistant metal or ceramic material. The blades 22 may be made of a material that reflects a laser beam (e.g., copper, brass, aluminum, or tungsten), and in this case, an advantage is obtained that the blades 22 are not heated to high temperature because they do not absorb the laser beam. The impeller 20 is cooled as required.

During a laser beam machining operation, contaminants 13 such as spatters are scattered from the workpiece 7 toward the machining head 5. However, since the impeller 20 is rotated at a high speed, such contaminants 13 are repulsed thereby. Namely, even if contaminants 13 reach a blade 22 and are about to pass by the width W thereof, they collide with the rotating blade 22 coming next and thus can be reliably blocked.

For example, provided that the number of the blades 22 is eight, the width W of the blades 22 is 40 mm, the distance between the focal point 7a and the blades 22 is 100 mm, and that the height up to which spatters are scattered is 500 mm, a rotational speed required to reliably repulse the spatters is 2850 rpm. The laser beam 2 is also intercepted by the blades 22, but since the speed of the laser beam 2 is equivalent to that of light and thus much greater than the rotational speed of the blades 22, the laser beam is intercepted only slightly by the blades 22 and the laser beam machining is not adversely affected.

As described above, the impeller 20 is arranged between the parabolic mirror 6 of the machining head 5 and the workpiece 7 and is rotated at a high speed. Accordingly, contaminants 13 spattered from the workpiece 7 toward the machining head 5 during laser welding can be reliably repulsed by the blades 22, and the optical parts arranged in the laser beam guide passage 12, such as the parabolic mirror 6 and other mirrors 3 and 4, etc., can be perfectly prevented from being stained by the contaminants 13. Also in the case of a three-dimensional machining operation in which the machining head 5 is oriented sideways or upward, contaminants 13 can be reliably repulsed by the impeller 20. Thus, the application of three-dimensional laser beam machining is in no way restricted.

Figure 3:
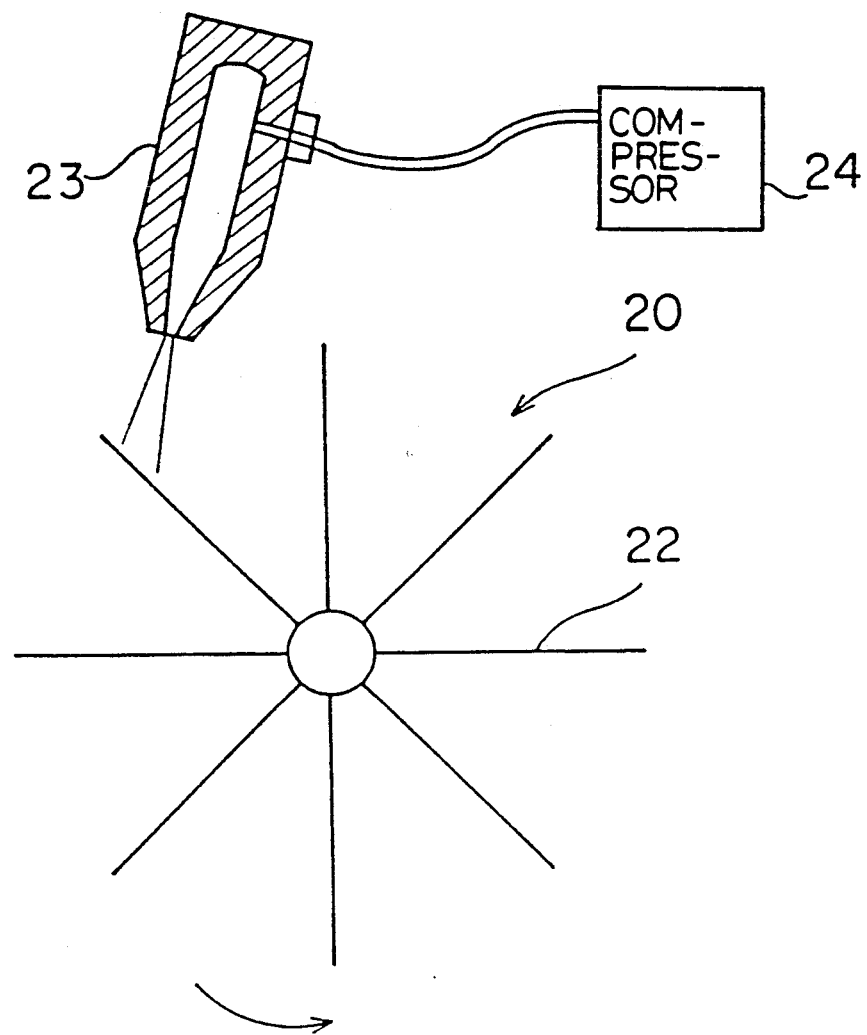
FIG. 3 is a diagram showing a second embodiment of this invention.

FIG. 3 shows a second embodiment of this invention. In this embodiment, the impeller 20 is driven by a high-speed flow of a gas ejected from an ejection nozzle 23, and the high-speed gas is supplied from a compressor 24. The ejection nozzle 23 provides the effect of cooling the impeller 20, and if it is arranged inside the machining head 5, contaminants 13 can be repulsed not only by the blades 22 but also by the high-speed gas flow.

As described above, according to this invention, the impeller is arranged between the workpiece and an optical part constituting the laser beam guide passage and is rotated at a high speed. Accordingly, contaminants spattered from the workpiece toward the machining head during laser welding can be reliably repulsed by the blades, and the optical parts arranged in the light guide passage, such as the parabolic mirror and other mirrors, can be perfectly prevented from being stained by the contaminants. Further, also during a three-dimensional machining operation in which the machining head is oriented sideways or upward, contaminants can be reliably repulsed by the impeller, and thus no restriction is imposed on the application of three-dimensional laser beam machining.

I claim:

1. A laser beam machine for machining a workpiece with a laser beam irradiated thereto, comprising:
   an optical part constituting a light guide passage for the laser beam; and
   an impeller arranged between the optical part and the workpiece and rotated at a high speed.

2. The laser beam machine according to claim 1, wherein said impeller is made of a heat-resistant metal or ceramic material.

3. The laser beam machine according to claim 1, wherein said impeller is made of a material which reflects the laser beam.

4. The laser beam machine according to claim 1, wherein said impeller is driven by a motor.

5. The laser beam machine according to claim 1, wherein said impeller is driven by a high-speed gas flow.

6. The laser beam machine according to claim 1, wherein said impeller is arranged between the workpiece and an optical part located at a lowest-course side of the light guide passage for the laser beam.

* * * * *